(No Model.) 3 Sheets—Sheet 1.
J. E. WALLACE.
HOT WATER HEATER.
No. 558,444. Patented Apr. 14, 1896.
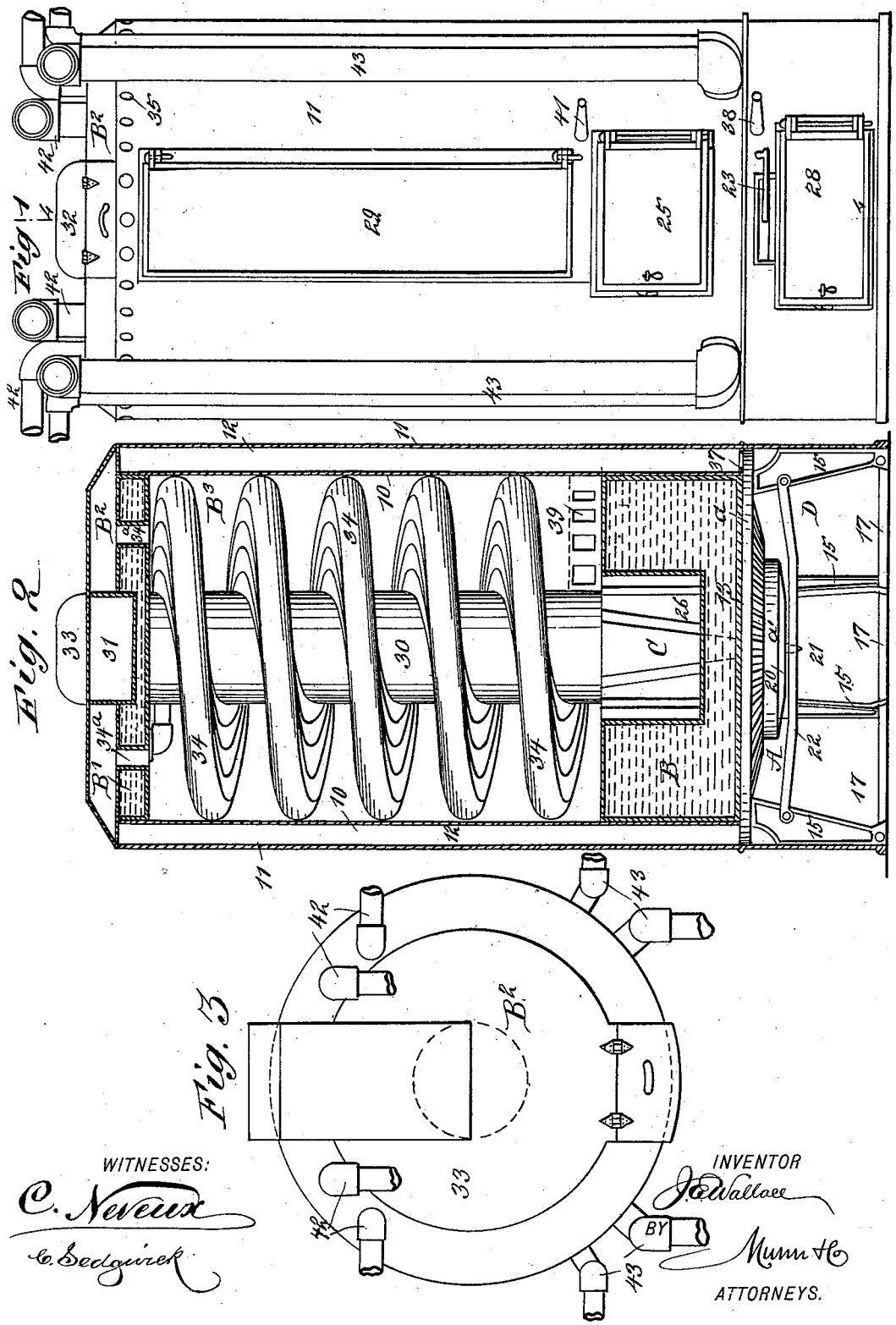
WITNESSES:
C. Neveux
C. Sedgwick
INVENTOR
J. E. Wallace
BY
Munn & Co
ATTORNEYS.

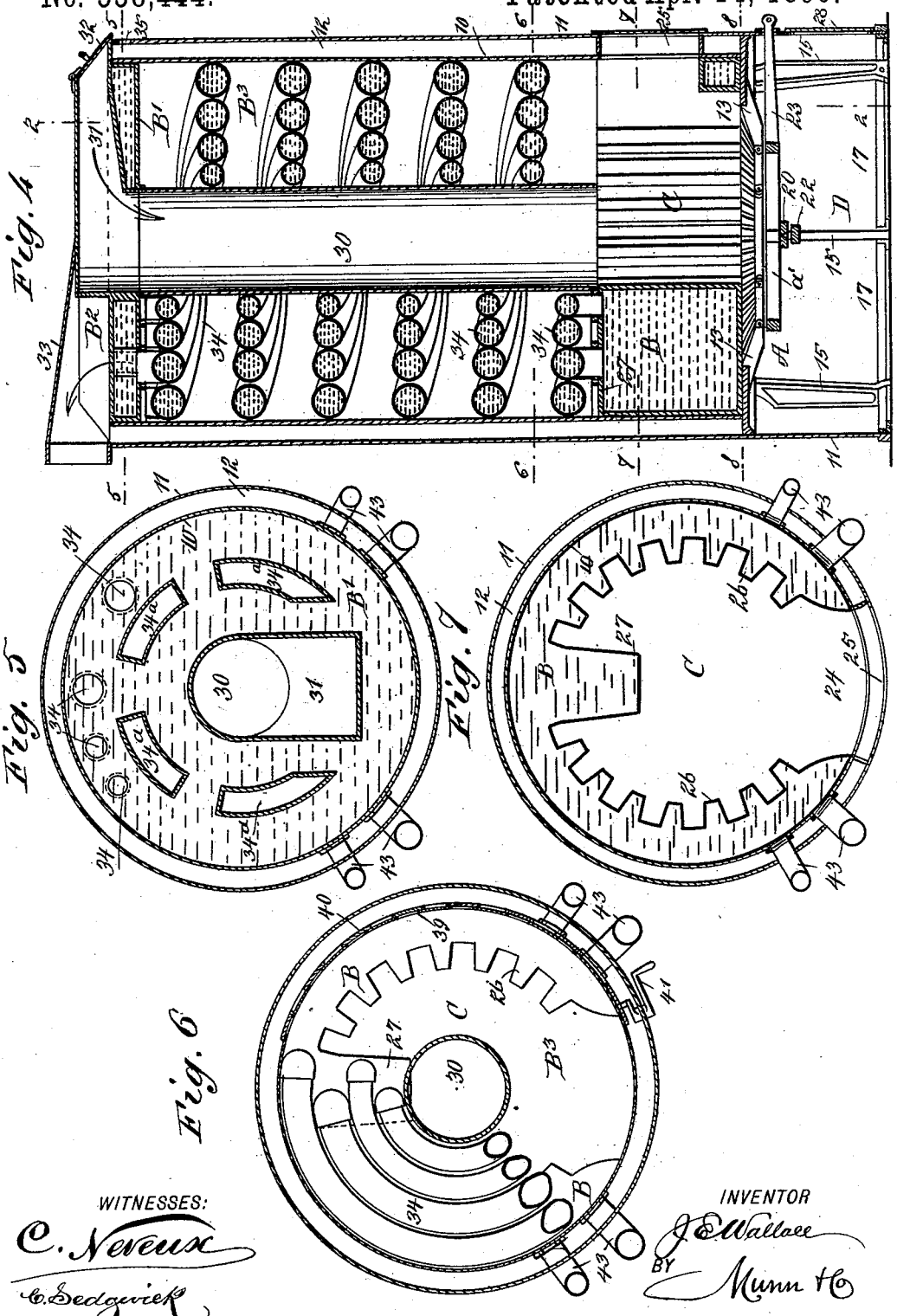

(No Model.) 3 Sheets—Sheet 3.
J. E. WALLACE.
HOT WATER HEATER.
No. 558,444. Patented Apr. 14, 1896.
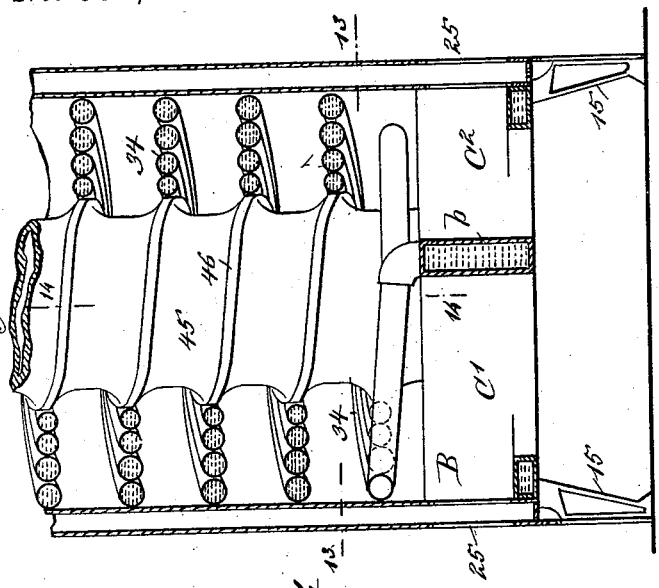
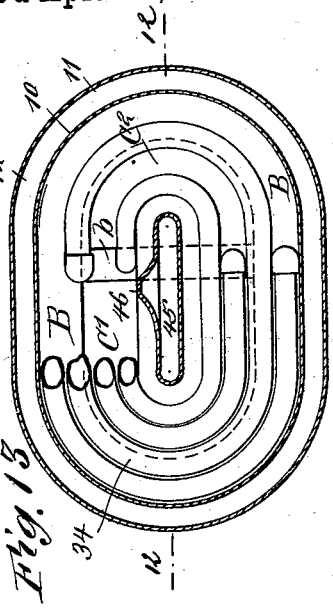
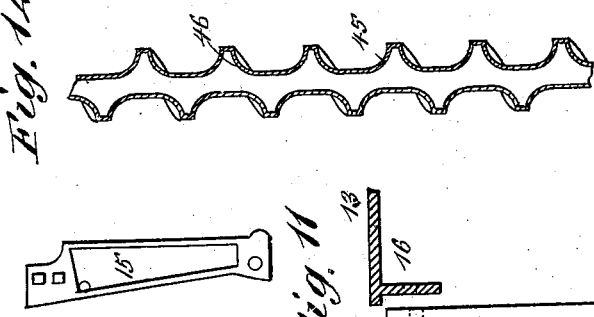
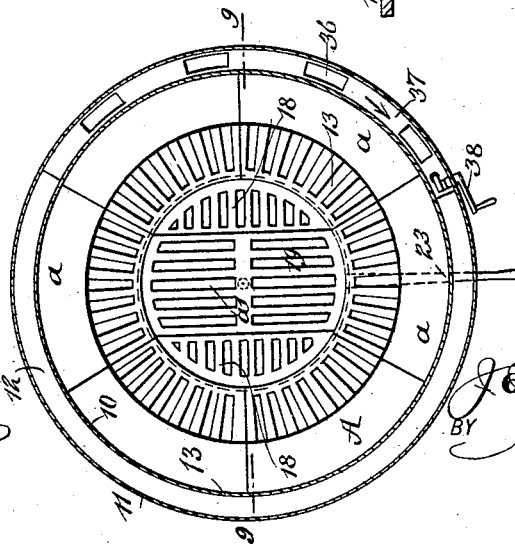
WITNESSES:
C. Neveux
C. Sedgwick
INVENTOR
J. E. Wallace
BY
Munn & Co.
ATTORNEYS.

UNITED STATES PATENT OFFICE.

JOHN ELLIOTT WALLACE, OF ALTOONA, PENNSYLVANIA.

HOT-WATER HEATER.

SPECIFICATION forming part of Letters Patent No. 558,444, dated April 14, 1896.

Application filed September 7, 1893. Serial No. 484,979. (No model.)

*To all whom it may concern:*

Be it known that I, JOHN ELLIOTT WALLACE, of Altoona, in the county of Blair and State of Pennsylvania, have invented a new and Improved Hot-Water Heater, of which the following is a full, clear, and exact description.

My invention relates to an improvement in hot-water heaters; and it has for its object to so construct the heater that the products of combustion and gases will be maintained in heating contact with the water and supply pipes contained within the heater for a maximum of time.

Another feature of the invention is to provide a perfect circulation of the water in the heater and throughout the system of pipes connected with it, and to provide, furthermore, for the feeding of heated air to the fire-pot, either above or below the same.

Another feature of the invention consists in the simple, durable, and economic manner in which the heater is constructed.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a front elevation of the improved heater. Fig. 2 is a vertical section through the casings thereof, illustrating the heating-pipes and their support in side elevation, the section being taken practically on the line 2 2 of Fig. 4. Fig. 3 is a plan view of the heater. Fig. 4 is a central vertical section through the same on the line 4 4 of Fig. 1. Fig. 5 is a horizontal section taken at the top of the heater and practically on the line 5 5 of Fig. 4. Fig. 6 is a horizontal section taken near the center and practically on the line 6 6 of Fig. 4. Fig. 7 is a horizontal section taken through the fire-pot and through the water reservoir or tank, practically on the line 7 7 of Fig. 4. Fig. 8 is a horizontal section taken practically on the line 8 8 of Fig. 4, illustrating the grate in plan view. Fig. 9 is a vertical section through the grate, said section being taken practically on the line 9 9 of Fig. 8. Fig. 10 is a detail side elevation of one of the legs adapted to support the grate. Fig. 11 is a section taken practically on the line 11 11 of Fig. 9, illustrating the manner in which the grate-sections are connected with the legs. Fig. 12 is a partial vertical section through a boiler, illustrating a slight modification in the construction thereof, two fire-pots being employed and the heater being especially adapted for burning soft coal, and the section is taken, essentially, on the line 12 12 of Fig. 13. Fig. 13 is a horizontal section through the modified form of heater, the section being taken on the line 13 13 of Fig. 12; and Fig. 14 is a vertical section through the column or water-back employed in the modified form of heater, said section being indicated by the line 14 14 in Fig. 12.

In carrying out the invention the body of the heater consists of two casings 10 and 11, between which a space 12 intervenes, the space being adapted as an air-space. The outer casing is longer than the inner one, and extends downward to what may be termed the "base" of the heater, while the inner casing 10 terminates at the grate A, and rests upon the fixed section 13 of the grate. This section of the grate is made up of a series of sections, designated as *a* and shown best in Figs. 8 and 9, each section comprising an upper horizontal portion and a toothed portion projected downward and inward from the horizontal portion. The sections of the fixed portion of the grate are segmental, as the grate is preferably of a circular shape, and the various sections *a* are secured together at their inner edges through the medium of lugs 14, through which bolts or rivets are passed, as shown also in Figure 9, or other equivalent means may be employed, and if in practice it is found desirable the horizontal or flange portion of the fixed portion 13 of the grate may be secured to the inner face of the outer casing 11, or may be made to simply abut against it. Preferably the fixed portion of the grate is supported through the medium of legs 15, and each section *a* of the fixed portion of the grate is provided at its ends with lugs 16, projected downward from the flange or horizontal portion thereof, and the upper end of the leg is secured to each two opposing lugs 16, as indicated in Fig. 11, being located between said lugs, and rivets or bolts are provided as fastening devices, and the lower ends of the legs are bolted or otherwise attached to segmental blocks or strips 17, as shown in Fig. 4, which blocks or strips are preferably angular in cross-section, and are made to embrace opposite sides of the legs, and are attached in any approved manner to the inner face of the outer body-casing 11, forming a portion of the base of the heater.

In addition to the fixed portion 13 of the grate, the said grate is provided with a shifting central horizontal portion $a'$, which is horizontally located beneath the open central portion of the fixed section of the grate, and the shifting portion is of circular contour, comprising two side segmental sections 18, united by a central sliding member 19, all of the members being barred in any approved manner, as shown in Figs. 8 and 9. The side or segmental members 18 of the shifting portion $a'$ of the grate are connected at their bottom portions by a cross-bar 20, as illustrated in Fig. 9, and the said cross-bar is provided with a socket in its under central portion to receive a pivoted lug 21, located upon a supporting-bar 22, which supporting-bar at its ends is preferably attached to conveniently-located legs 15. Thus it will be observed that the shifting section of the grate may be turned bodily upon its pivot, so as to shake the bed of the fire in a lateral rotary direction, while the bed of fire may be laterally reciprocated in a measure by imparting sliding movement to the central sliding member of the grate. A rotating and sliding movement is imparted to the shifting portion of the grate through the medium of a lever 23, which is preferably connected with the sliding section and extends outward through a suitable opening in the outer casing.

The water-reservoir B, to be contained within the heater, is made to rest upon the flange or horizontal member of the fixed portion 13 of the grate, as shown in Figs. 2 and 4. The reservoir is in tank form and is preferably made of cast-iron, and its shape is shown best in Fig. 7, in which it will be observed that it is nearly of circular contour, following the shape of the inner casing 10, against which it bears, except at the front, where a space intervenes between the ends of the reservoir or tank, and immediately in front of this space the fire-door 25 is located in the two casings of the heater, the door being sufficiently thick to extend from one casing to the other. The space 24, between the end portions of the reservoir, does not extend to the bottom, as the bottom portion is entirely circular, as will be observed by the diametrical vertical section of the reservoir illustrated in Fig. 4. The reservoir is provided with a central space, and this space constitutes the fire-pot C, the outlet of the fire-pot being through the space 24 between the upper end portions of the reservoir.

In order that a maximum of heating-surface may be obtained, the wall of the fire-pot—that is to say, the inner wall of the hot-water reservoir—is more or less corrugated, as shown at 26 in Fig. 7, and immediately at the back of the tank or reservoir an extension or branch 27 is formed, which projects some distance within the fire-pot and faces the fire-door 25, as the hot water is to be taken from the reservoir at its rear extension 27, and the return water is to be delivered to the reservoir at the front portion thereof.

The casing of the heater is provided with an ash-pit door 28, which gives access to the ash-pit D, located beneath the grate, and quite a large door 29 is located above the fire-door, by means of which access may be obtained to the air-space 12 of the body and to the interior of the heater for purposes of cleaning the same.

A second tank or reservoir B' is located at the top of the heater, being secured in any suitable or approved manner, preferably to the inner wall of the inner casing 10, and through this tank or reservoir a magazine-cylinder 30 is projected downward within the heater, its lower end being over the fire-pot, as shown in Fig. 4. The magazine-cylinder extends through and above the top portion of the tank proper, B', and is provided at its upper end with a branch 31, which extends to the front portion of the casing and is fitted with a cover 32, as shown in Figs. 1 and 4. The tank B' is surmounted by a hollow cap $B^2$, which extends over the air-space 12 to the outer casing of the heater, as shown in Figs. 2 and 4. This cap covers the branch 31 of the magazine-cylinder; but the door 32 of the cylinder is exposed, and at the rear of the heater the cap is provided with a hood 33, which forms a flue to be connected with any smoke-pipe, as through the flue 33 the waste products of combustion are adapted to escape, and to that end the upper tank or reservoir B' is provided with walled openings $34^a$, as shown in Figs. 2 and 5, extending through it from top to bottom, whereby the products of combustion may leave the main chamber $B^3$ in the heater and pass up into the hollow cap and find an exit through the flue 33.

The upper and lower tanks or reservoirs are connected by a series of pipes 34, the upper ends of the pipes being made to enter or connect with the interior of the upper reservoir, the connection being effected through the bottom thereof, while, as heretofore stated, the lower ends of the pipes are made to enter the lower or main reservoir through the upper portion of its rear lug 27. The pipes 34 are spirally located, being carried in a circuitous manner around the magazine-cylinder 30, and the preferred arrangement of the series of pipes is one in engagement with the side of the other, or, in other words, the pipes are placed substantially in lateral engagement with each other; but a space may be left between them, if desired.

It is evident from this construction that the products of combustion, and likewise the gases, will be held for a maximum of time within the main chamber B³, and consequently in engagement with and around the conducting pipes or sections 34, since the gases and other products of combustion are compelled to ascend in a circuitous manner, following the line of the pipes or sections 34, since said products of combustion can find no other exit from the chamber B³ until they have reached the upper coil, as a sufficient number of pipes are used to cause each coil of the combined pipes, or each section, if sections are used, to engage at their outer surfaces with the inner wall of the inner casing 10. When the products of combustion have ascended to the top of the chamber B³ in the slow manner above described, they can then escape through the openings 34ᵃ in the upper portion of the chamber, and find exit through the flue 33.

Air is admitted to the air-space 12 through the medium of a series of openings 35, made in the upper portion of the outer casing or shell 11, at or near its top, as shown in Figs. 1 and 4, and the air contained in the said air-space 12 may be permitted to pass beneath the grate by producing in the flange of the fixed section of the grate A, or whatever portion of the structure constitutes the bottom of the air-space, a series of openings 36, to be controlled by dampers, which dampers may be in the nature of a slide 37, as shown in Fig. 8, having openings to correspond to those in the bottom of the air-space, the said slide being manipulated by a lever 38, or like device, in a manner to open or close the exit-openings for the air. Any form of lever may be employed for this purpose, and it is located upon the exterior and preferably the front portion of the heater, so as to be conveniently reached. Another series of openings 39 is produced in the inner casing or shell 10 just above the fire-pot, as shown in Figs. 2 and 6, and these openings are controlled by a damper 40, which may be of like construction as the damper 37, and it is operated through the medium of a lever 41, also located exteriorly upon the heater, and preferably near the front.

The hot water is taken from the upper tank or reservoir B' and carried wherever it may be needed through the medium of supply-pipes 42, which enter the said tank or reservoir through the top of the heater at the front thereof, while the return-pipes 43 are made to connect with the lower or main reservoir or tank B at the front portion of the heater. It will thus be observed that the water entering the lower reservoir at the front must practically make the circuit thereof, or must pass to the rear and enter the leg 27, before it can be received into the heating coil or section 34, contained in the chamber B³.

In the operation of the heater, when the fire is first made, the ash-pit door is opened in order that quick and direct draft may be provided for the fire-pot; but after the atmosphere has become heated around the heater the ash-pit door is closed and the damper 37 is opened, whereupon the air around the heater will enter the air-space 12 through its inlet-openings 35, and will pass down through said space to the bottom of the grate. The air in a heated condition will then be supplied to the fire. In the event the fire should burn too fierce the lower air-openings 36 are closed by means of the damper 37 and the upper air-supply openings 39, or those located above the grate, are opened, the damper 40 being manipulated, and the heated air will be distributed over the top of the fire instead of at the bottom.

The construction of the fire-pot and the manner of feeding in the coal heretofore described are preferred when hard coal is to be used; but when soft coal is to be employed the construction may be slightly varied, as shown in Fig. 12. Under this latter construction the cylinder-magazine 30 is dispensed with and in its stead a water-back or column 45 is substituted. This water-back or column is adapted as a support for the water-heating tubes or sections 34, which are carried spirally around the column or water-back, and in order that the column or water-back may take up the least possible amount of room, and yet afford perfect support for the tubes or sections 34, the water-back is made more or less elongated in cross-section, as shown in Fig. 13, and is provided with an exterior spiral rib 46, against which the inner surface of the water-heating section or the inner pipe of the coil has bearing, the sections or pipes following the rib.

In Fig. 12 I have likewise shown two fire-pots C' and C², one of which is larger than the other, and two fire-doors 25 are employed, one for each fire-pot, the object being to provide a means for maintaining a large or a small fire, as occasion may demand. Therefore the lower tank or reservoir B is provided with a connecting branch b at one side of its center and the body of the reservoir is more or less oval, as shown in Fig. 13. The lower ends of the heating sections or coils 34 are in this instance connected with the tank or reservoir B through the medium of its diametrical branch b.

Having thus described my invention, I claim as new and desire to secure by Letters Patent—

1. In a hot-water or other heater, the combination with a casing having an exit-flue at the top, of a reservoir at the lower part of the casing and having its central portion shaped as a fire-pot, a combustion-chamber above the reservoir, a second reservoir above the combustion-chamber at the top of the casing and having passages through it, a hollow column in the combustion-chamber, and a water-passage connecting the said reservoirs, said passage consisting of a series of tubes arranged spirally around the column the said tubes engaging the inner surface of the combustion-chamber and being in contact with each other to form an unbroken spiral combustion-passage, substantially as described.

2. In a hot-water or other heater, the combination with a combustion-chamber, and a water-reservoir at each end of the same, of a hollow column in the combustion-chamber and extending from end to end thereof, and a series of pipes connecting the reservoirs and arranged spirally around the column, said pipes being in contact with each other and with the inner surface of the said chamber and forming a spiral passage for both the water and the products of combustion, substantially as described.

3. In a hot-water or other heater, a heating-chamber, a water-receiving tank in the bottom of the chamber, a fire-pot being formed in the central portion of the tank, service-pipes connected with the upper portion of the chamber, which is practically closed, being provided with exit-openings for waste products of combustion, a hollow support located longitudinally within the chamber, and conducting and heating pipes arranged spirally around the central hollow support and engaging the sides of the chamber, the said conducting and heating pipes being connected with a tank at their lower ends while they are in communication with the service-pipes at their opposite ends, substantially as shown and described.

4. In a hot-water or other heater, the combination, with a heating-chamber, a tank located at one end, the central portion of which is open and shaped as a fire-pot, and a tank adapted to receive heated water, located at the upper end of the heating-chamber, which tank is in communication with service-pipes, and is provided with series of outlets for products of combustion, of a support located within the chamber, heating or conducting pipes or sections arranged spirally within the chamber around the support and extending from end to end thereof, the pipes or sections being connected with both the upper and the lower tank, and return-pipes connected with the lower tank at a point substantially opposite the connection of said tank with the conducting and heating pipes, substantially as and for the purpose set forth.

5. In a hot-water or other heater, the combination with a casing having an exit-flue at the top, of a lower reservoir having its central portion shaped as a fire-pot and provided at its rear with an inwardly-projecting extension combustion-chamber above the reservoir, an upper reservoir having passages through it leading to the exit-flue, a hollow column in the combustion-chamber, said column being arranged over the fire-pot and having its upper end extending through the upper reservoir, and a series of pipes connected with the extension of the lower reservoir and with the bottom of the upper reservoir, said pipes being arranged spirally around the column in contact with each other and with the inner surface of the combustion-chamber, substantially as described.

6. In a hot-water or other heater, the combination, with a heating-chamber containing a water-heating tank, a fire-pot, and water-heating tubes or sections in connection with the tank, of a jacket surrounding the heating-chamber, forming an air-space around the same, said jacket being provided with air-inlet openings near its upper end, the bottom of the air-space having valved openings therein, valved openings being likewise produced in the wall of the heating-chamber above the fire-pot whereby air may be conducted in a heated state either above or below the fire-pot, as and for the purpose specified.

7. In a hot-water heater, the combination with a casing having an exit-flue at the top, of a reservoir at the bottom of the casing and having its central portion shaped as a fire-pot, a combustion-chamber above the reservoir, a second reservoir at the top of the casing and having passages through it, a hollow column in the combustion-chamber and having an exterior spiral rib, and a series of pipes connected at their ends with the said reservoirs, said pipes being arranged spirally around the column in contact with each other and with the inner surface of the combustion-chamber, the innermost pipe being in contact with the rib of the column, substantially as described.

8. In a hot-water heater, the combination with a casing having an exit-flue at the top, of a reservoir at the bottom of the casing and having its central portion shaped as a fire-pot, a combustion-chamber above the reservoir, a second reservoir at the top of the casing, a hollow column arranged over the fire-pot and having its upper end extending through the upper reservoir and provided with a branch extending to the front of the casing and fitted with a cover, and a series of pipes or tubes connected with the said reservoirs, said pipes or tubes being arranged spirally around the column and in contact with each other to form an unbroken spiral combustion-passage, substantially as herein shown and described.

JOHN ELLIOTT WALLACE.

Witnesses:
BOYD G. STEEL,
WILLIAM C. HOAR.